US007908048B2

(12) United States Patent
Vigholm et al.

(10) Patent No.: US 7,908,048 B2
(45) Date of Patent: Mar. 15, 2011

(54) CONTROL SYSTEM FOR A WORK MACHINE AND METHOD FOR CONTROLLING A HYDRAULIC CYLINDER

(75) Inventors: Bo Vigholm, Stora Sundby (SE); Markku Palo, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 498 days.

(21) Appl. No.: 12/097,923

(22) PCT Filed: Jan. 16, 2007

(86) PCT No.: PCT/SE2007/000039
§ 371 (c)(1), (2), (4) Date: Jun. 18, 2008

(87) PCT Pub. No.: WO2007/081279
PCT Pub. Date: Jul. 19, 2007

(65) Prior Publication Data

US 2009/0287373 A1 Nov. 19, 2009

Related U.S. Application Data

(60) Provisional application No. 60/759,996, filed on Jan. 18, 2006.

(30) Foreign Application Priority Data

Jan. 16, 2006 (SE) ...................................... 0600087

(51) Int. Cl.
*E02F 9/22* (2006.01)
*F15B 21/14* (2006.01)
*G06F 19/00* (2006.01)

(52) U.S. Cl. ................. 701/22; 701/41; 701/50; 60/327

(58) Field of Classification Search .................... 701/22, 701/41, 50, 54; 700/282; 417/18, 20, 216; 60/327, 428
See application file for complete search history.

(56) References Cited

U.S. PATENT DOCUMENTS

| | | | | |
|---|---|---|---|---|
| 6,502,393 | B1 * | 1/2003 | Stephenson et al. | 60/414 |
| 7,089,733 | B1 * | 8/2006 | Jackson et al. | 60/422 |
| 2004/0055289 | A1 * | 3/2004 | Pfaff et al. | 60/422 |
| 2005/0066655 | A1 * | 3/2005 | Aarestad et al. | 60/413 |

FOREIGN PATENT DOCUMENTS

EP 1571352 A1 9/2005

OTHER PUBLICATIONS

International Search Report from corresponding International Application No. PCT/SE2007/000039.
International Preliminary Report on Patentability from corresponding International Application No. PCT/SE2007/000039.

* cited by examiner

*Primary Examiner* — Tan Q Nguyen
(74) *Attorney, Agent, or Firm* — WRB-IP LLP

(57) ABSTRACT

A control system for a work machine is provided, which system includes an electric machine, a hydraulic machine and at least one hydraulic cylinder. The electric machine is connected in a driving manner to the hydraulic machine. The hydraulic machine is connected to a piston side of the hydraulic cylinder via a first line and a piston-rod side of the hydraulic cylinder via a second line. The hydraulic machine is adapted to be driven by the electric machine and supply the hydraulic cylinder with pressurized hydraulic fluid from a tank in a first operating state and to be driven by a hydraulic fluid flow from the hydraulic cylinder and drive the electric machine in a second operating state.

56 Claims, 14 Drawing Sheets

CONTROL SYSTEM FOR A WORK MACHINE AND METHOD FOR CONTROLLING A HYDRAULIC CYLINDER

BACKGROUND AND SUMMARY

The present invention relates to a control system for a work machine and a method for controlling at least one hydraulic cylinder.

The invention will be described below in connection with a work machine in the form of a wheel loader. This is a preferred but in no way limiting application of the invention. The invention can also be used for other types of work machines (or work vehicles), such as an excavator loader (backhoe) and excavating machine.

The invention relates, for example, to controlling lifting and/or tilting cylinders for operating an implement.

More precisely, the invention relates to a control system which comprises a hydraulic machine which functions as both pump and motor. The hydraulic machine is connected in a driving manner to an electric machine which functions as both motor and generator.

The hydraulic machine therefore functions as a pump in a first operating state and supplies pressurized hydraulic fluid to the hydraulic cylinder. The hydraulic machine also functions as a hydraulic motor in a second operating state and is driven by a hydraulic fluid flow from the hydraulic cylinder. The electric machine therefore functions as an electric motor in the first operating state and as a generator in the second operating state.

The first operating state corresponds to a work operation, such as lifting or tilting, being carried out with the hydraulic cylinder. Hydraulic fluid is therefore directed to the hydraulic cylinder for movement of the piston of the cylinder. On the other hand, the second operating state is an energy recovery state.

A first object of the invention is to provide a control system, preferably for a lifting and/or tilting function, which affords an opportunity for energy-efficient operation.

According to an aspect of the present invention, a control system is provided for a work machine, which system comprises an electric machine, a hydraulic machine and at least one hydraulic cylinder, the electric machine being connected in a driving manner to the hydraulic machine, the hydraulic machine being connected to a piston side of the hydraulic cylinder via a first line and a piston-rod side of the hydraulic cylinder via a second line, the hydraulic machine being adapted to be driven by the electric machine and supply the hydraulic cylinder with pressurized hydraulic fluid from a tank in a first operating state and to be driven by a hydraulic fluid flow from the hydraulic cylinder and drive the electric machine in a second operating state.

The hydraulic cylinder is preferably adapted to move an implement in order to perform a work function. According to a first example, the hydraulic cylinder comprises a lifting cylinder for moving a loading arm which is pivotably connected to a vehicle frame, the implement being arranged on the loading arm. According to a second example, the hydraulic cylinder comprises a tilting cylinder for moving the implement which is pivotably connected to the loading arm.

The speed of the cylinder is preferably controlled directly by the electric machine, that is to say no control valves are required between the hydraulic machine and the cylinder for regulating direction and speed of the movement. In some cases, on/off valves which open and respectively close a communication for the hydraulic fluid flow are required.

According to a preferred embodiment of the invention, the hydraulic machine has a first port which is connected to the piston side of the hydraulic cylinder via the first line and a second port which is connected to the piston-rod side of the hydraulic cylinder via the second line. The second port is thus separated from the first port. In addition, the hydraulic machine is preferably arranged to be driven in two different directions, with one direction being associated with a flow out from the first port and the second direction being associated with a flow out from the second port. The hydraulic machine is thus capable of pumping in both directions.

According to another preferred embodiment of the invention, the system comprises a means for controlling pressure, which pressure means is arranged on a line between the hydraulic machine and the tank, to achieve a pressure build-up between the hydraulic machine and the pressure means. In this way, it is possible to achieve a refilling of the piston-rod side of the hydraulic cylinder during lowering, a forced lowering of the implement (so-called "power down"), and additional energy recovery, etc. Either the piston side or the piston-rod side is preferably connected to the line between the hydraulic machine and the pressure means.

A second object of the invention is to achieve a method for controlling a hydraulic cylinder that makes it possible to carry out a forced lowering ("power down") of the implement.

According to an aspect of the present invention, a method is provided for controlling a hydraulic cylinder under the influence of a load, with a hydraulic machine being operatively connected to the hydraulic cylinder via a first line and to a tank via a second line, comprising the steps of controlling the hydraulic machine in such a way that it is allowed to be driven by a flow of hydraulic fluid from the hydraulic cylinder, of detecting an operating parameter that is indicative of a pressure on the piston side of the hydraulic cylinder, of comparing the detected pressure with a predetermined level and of increasing the pressure on the piston-rod side of the hydraulic cylinder if the detected pressure is less than the predetermined level.

By this means, it is also possible to achieve a refilling of the piston-rod side of the hydraulic cylinder during lowering.

A third object of the invention is to achieve a method that makes possible an efficient recovery of energy during movement of the hydraulic cylinder under the influence of a load.

According to an aspect of the present invention, a method is provided for regeneration of energy during movement of a hydraulic cylinder under the influence of a load, with a hydraulic machine being operatively connected to the hydraulic cylinder via a first line and to a tank via a second line, comprising the steps of controlling the hydraulic machine in such a way that it is allowed to be driven by a flow of hydraulic fluid from the hydraulic cylinder, of detecting at least one operating parameter and of increasing the pressure in the line between the hydraulic machine and the tank, on the basis of the detected operating parameter, in order to increase the pressure on the tank side of the hydraulic machine.

Further preferred embodiments and advantages of the invention emerge from the following description.

BRIEF DESCRIPTION OF THE DRAWINGS

The invention will be described in greater detail below with reference to the embodiments shown in the accompanying drawings, in which.

DETAILED DESCRIPTION

Figure 1:
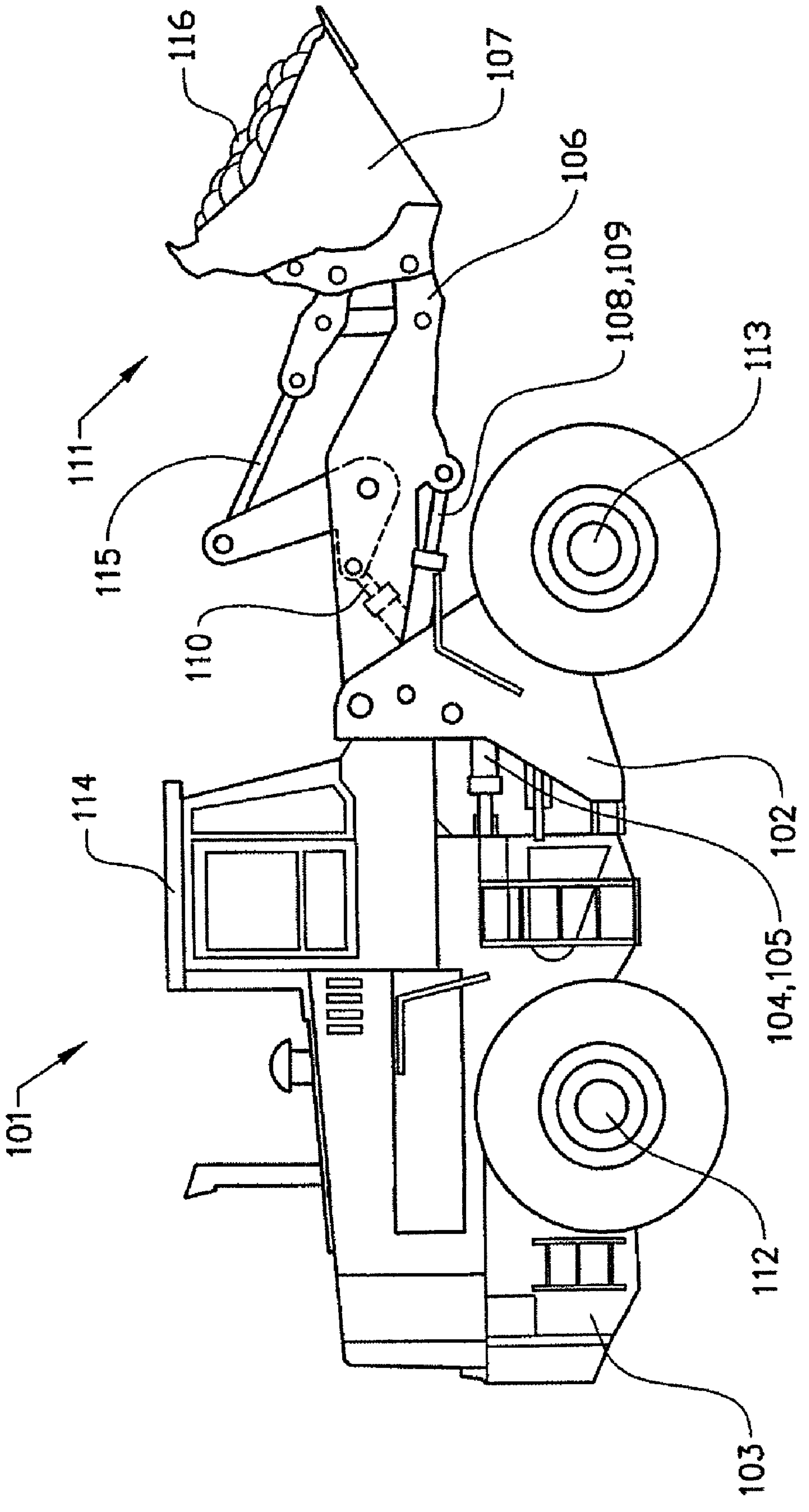
FIG. 1 shows a side view of a wheel loader.

FIG. 1 shows a side view of a wheel loader 101. The wheel loader 101 comprises a front vehicle part 102 and a rear vehicle part 103, which parts each comprise a frame and a pair of drive axles 112, 113. The rear vehicle part 103 comprises a cab 114. The vehicle parts 102, 103 are coupled together with one another in such a way that they can be pivoted in relation to one another about a vertical axis by means of two hydraulic cylinders 104, 105 which are connected to the two parts. The hydraulic cylinders 104, 105 are thus arranged on different sides of a center line in the longitudinal direction of the vehicle for steering, or turning the wheel loader 101.

The wheel loader 101 comprises an apparatus 111 for handling objects or material. The apparatus 111 comprises a lifting arm unit 106 and an implement 107 in the form of a bucket which is mounted on the lifting arm unit. Here, the bucket 107 is filled with material 116. A first end of the lifting arm unit 106 is coupled rotatably to the front vehicle part 102 for bringing about a lifting movement of the bucket. The bucket 107 is coupled rotatably to a second end of the lifting arm unit 106 for bringing about a tilting movement of the bucket.

The lifting arm unit 106 can be raised and lowered in relation to the front part 102 of the vehicle by means of two hydraulic cylinders 108, 109, which are each coupled at one end to the front vehicle part 102 and at the other end to the lifting arm unit 106. The bucket 107 can be tilted in relation to the lifting arm unit 106 by means of a third hydraulic cylinder 110, which is coupled at one end to the front vehicle part 102 and at the other end to the bucket 107 via a link arm system.

A number of embodiments of a control system for the hydraulic functions of the wheel loader 101 will be described in greater detail below. These embodiments relate to lifting and lowering of the lifting arm 106 via the lifting cylinders 108, 109, see FIG. 1. However, the various embodiments of the control system could also be used for tilting the bucket 107 via the tilting cylinder 110.

Figure 2:
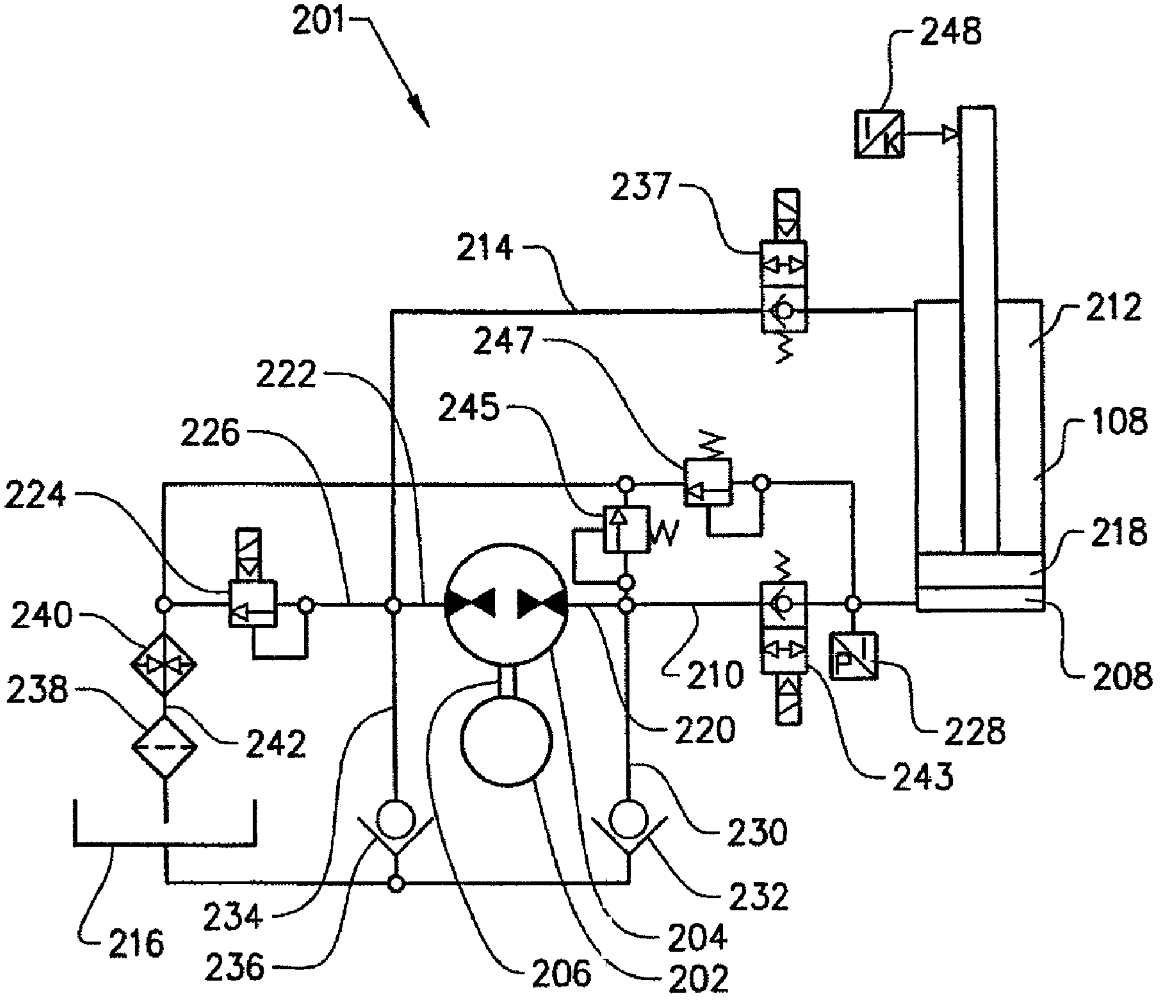
FIGS. 2-6 show different embodiments of a control system for controlling a work function of the wheel loader.

FIG. 2 shows a first embodiment of a control system 201 for performing lifting and lowering of the lifting arm 106, see FIG. 1. The hydraulic cylinder 108 in FIG. 2 therefore corresponds to the lifting cylinders 108, 109 (although only one cylinder is shown in FIG. 2).

The control system 201 comprises an electric machine 202, a hydraulic machine 204 and the lifting cylinder 108. The electric machine 202 is connected in a mechanically driving manner to the hydraulic machine 204 via an intermediate drive shaft 206. The hydraulic machine 204 is connected to a piston side 208 of the hydraulic cylinder 108 via a first line 210 and a piston-rod side 212 of the hydraulic cylinder 108 via a second line 214.

The hydraulic machine 204 is adapted to function as a pump, be driven by the electric machine 202 and supply the hydraulic cylinder 108 with pressurized hydraulic fluid from a tank 216 in a first operating state and to function as a motor, be driven by a hydraulic fluid flow from the hydraulic cylinder 108 and drive the electric machine 202 in a second operating state.

The hydraulic machine 204 is adapted to control the speed of the piston 218 of the hydraulic cylinder 108 in the first operating state. No control valves are therefore required between the hydraulic machine and the hydraulic cylinder for said control. More precisely, the control system 201 comprises a control unit 802, see FIG. 8, which is electrically connected to the electric machine 202 in order to control the speed of the piston of the hydraulic cylinder 108 in the first operating state by controlling the electric machine.

The hydraulic machine 204 has a first port 220 which is connected to the piston side 208 of the hydraulic cylinder via the first line 210 and a second port 222 which is connected to the piston-rod side 212 of the hydraulic cylinder via the second line 214. The second port 222 of the hydraulic machine 204 is moreover connected to the tank 216 in order to allow the hydraulic machine, in the first operating state, to draw oil from the tank 216 via the second port 222 and supply the oil to the hydraulic cylinder 108 via the first port 220.

In certain situations, such as when it is desired to press a material down or to flatten something, it is necessary to lower the bucket 107 with more force than is the case when only the load drives the movement of the piston 218. Such forced or intensified lowering is usually referred to as "power down". This power down function can also be used for lifting the vehicle. The control system 201 comprises a means 224 for controlling pressure, which pressure means 224 is arranged on a line 226 between the second port 222 of the hydraulic machine 204 and the tank 216 in order to allow pressure build-up on the piston-rod side 212. More precisely, the pressure control means 224 comprises an electrically controlled pressure-limiting valve.

The control system 201 also comprises a sensor 228 for sensing pressure on the piston side 208 of the hydraulic cylinder. When a low pressure value is detected on the piston side, the line 226 to the tank is blocked via the pressure-limiting valve 224, which results in the pressure in the line 214 to the piston-rod side being increased and said intensified downward movement (power down) being obtained. During lowering, the pressure sensor registers that the pressure is below a certain level (for example 20 bar) on the piston side. The pressure level on the electrically controlled pressure limiter is then increased to a suitable level so that pressure build-up takes place on the piston-rod side of the hydraulic cylinder.

In other words, a flow in the line 226 from the hydraulic machine 204 to the tank is partially restricted, with the piston-rod side of the hydraulic cylinder being connected to the said line 226.

According to an alternative to utilizing the electrically controlled pressure-limiting valve in order to achieve a forced lowering of the implement, it is possible to control the valve during a normal lowering of the implement in order to increase the pressure on the piston-rod side of the hydraulic cylinder to such an extent that a refilling of the piston-rod side is achieved. In this case, the pressure on the piston-rod side of the hydraulic cylinder does not need to be increased to the same extent as during forced lowering.

The electrically controlled pressure limiter 224 can thus be used as a back-up valve for refilling the piston-rod side 212 when lowering is carried out. The back pressure can be varied as required and can be kept as low as possible, which saves energy. The hotter the oil, the lower the back pressure can be, and the slower the rate of lowering, the lower the back pressure can be. When there is a filtration flow, the back pressure can be zero.

Figure 10:
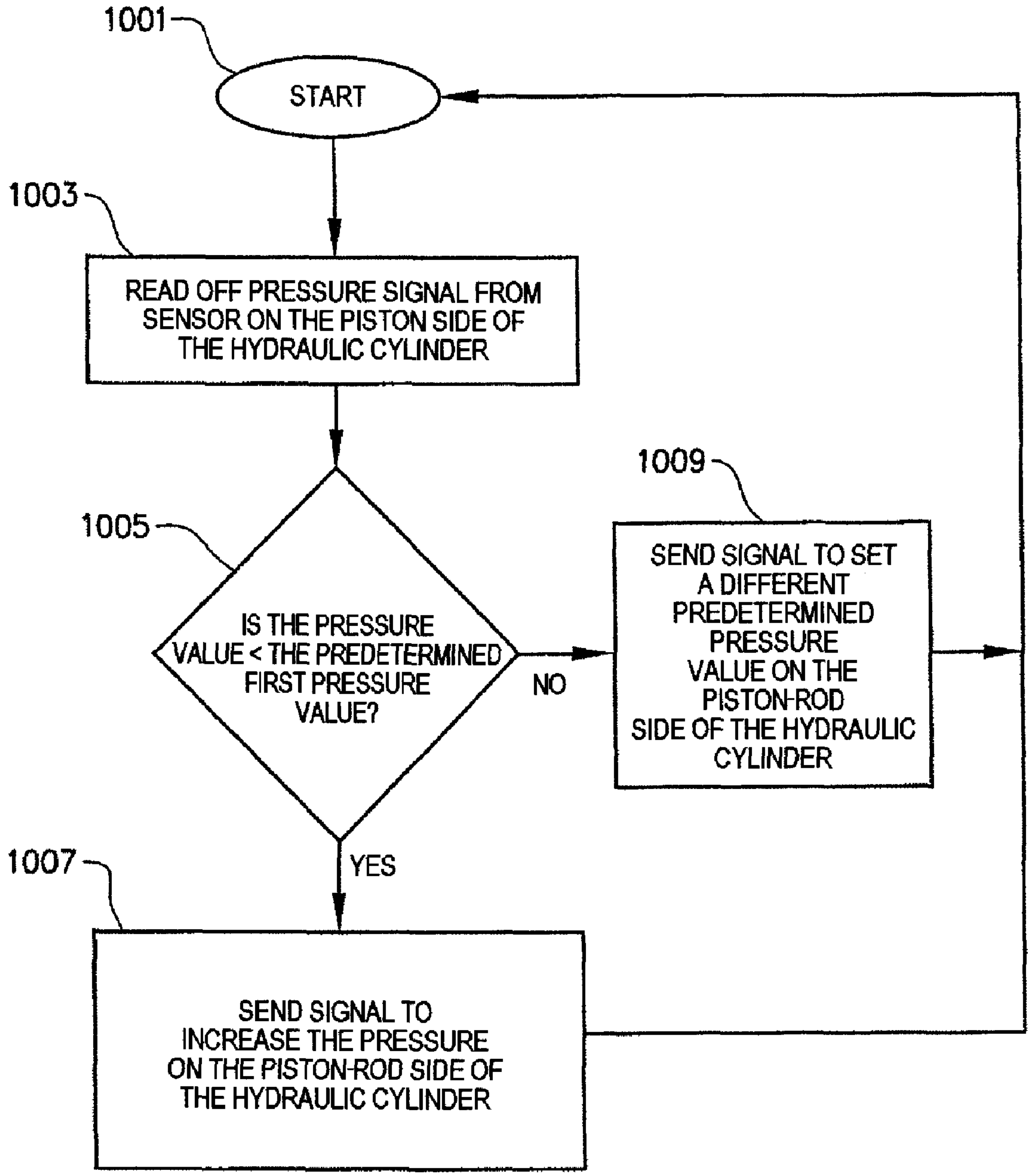
FIG. 10 shows a flow diagram for a forced lowering of the implement, according to a first example.

FIG. 10 illustrates a flow diagram for the logic circuit in the forced lowering. After receiving a signal that "power down" is required, the logic circuit commences at the initial block 1001. Following this, the control unit continues to block 1003, where a pressure signal from the pressure sensor 228 is read off. In the next block 1005, the detected pressure value is compared with a predetermined first, upper pressure value. If the detected pressure value is less than the predetermined pressure value, a signal is sent to the electrically controlled pressure-limiting valve 224 so that it increases the pressure on the piston-rod side of the hydraulic cylinder, see block 1007, sufficiently for the "power down" function. If the detected pressure value is greater than the predetermined pressure value, a signal is sent to the electrically controlled pressure-limiting valve 224 so that it sets a second predetermined pressure, in the form of a basic pressure, on the piston-rod side of the hydraulic cylinder, see block 1009. The basic pressure corresponds to a pressure value that is sufficient to bring about refilling of the piston-rod side, for example 4 bar.

An additional aspect of the invention relates to a method for regeneration of energy during lowering of the lifting cylinder 108, 109 under the influence of a load. This method can, for example, be utilized for discharging an energy storage means, such as a super capacitor. One example consists of or comprises the energy storage means being full, whereupon the energy must be utilized in some other way in order to permit lowering. The following are examples of solutions for converting the lowering energy to heat in the hydraulic fluid.

During lowering of the load arm or emptying of the bucket, energy can be regenerated. If the energy store is almost full, the whole movement of lowering/emptying cannot take place. In this case, energy can thus be dumped to the hydraulic tank as heat.

The hydraulic machine 204 is thus operatively connected to the hydraulic cylinder 108, 109 via the first line 210 and to the tank 216 via the second line 226. During regeneration, the hydraulic machine 204 is controlled in such a way that it is allowed to be driven by a flow of hydraulic fluid from the hydraulic cylinder 108. The method comprises detecting at least one operating parameter and increasing the pressure in the line 226 between the hydraulic machine 204 and the tank 216, on the basis of the detected operating parameter, in order to increase the pressure on the tank side of the hydraulic machine 204.

More specifically, the method comprises the steps of controlling the pressure control means 224 that is arranged on the line 226 between the hydraulic machine 204 and the tank 216, on the basis of the detected operating parameter, in such a way that the pressure on the tank side of the hydraulic machine 204 is increased. The energy is suitably regenerated from the hydraulic machine 204 to an energy storage means 820, see FIG. 8, via the electric machine 202.

By pressurizing the pilot-controlled pressure limiter 224, the excess flow (=piston volume–piston rod volume) will pass through the pressure limiter 224 to the tank and, accordingly, this amount of energy can be dumped. If the area of the piston-rod side is 70% of the piston side, this means that 30% of the lowering energy can be dumped to the tank.

Pressurizing of the piston-rod side 212 then takes place, which means that the pressure in the piston side 208 is increased to a higher level. This means that this method can only be used for loads where the pressure level does not exceed the level that the pump can handle or the level at which a shock valve opens. The speed of the electrical motor 202 determines the speed of the cylinder.

According to a first embodiment, the method therefore comprises the step of first detecting an operating parameter that is indicative of the present energy level in the energy storage means 820, of comparing the detected value of the energy level with a predetermined value, and of increasing the pressure on the tank side of the hydraulic machine 204 if the detected energy level exceeds the predetermined value. The predetermined value corresponds to the energy storage means being full, or being almost full. In such a case, it is necessary to avoid trying to store more energy in the energy storage means. By causing the pressure-limiting valve 224 to increase the pressure, the energy storage means is thus discharged. In other words, the excess energy is bled away in the pressure-limiting valve 224. The excess energy is thus largely converted to heat in the hydraulic fluid.

According to an alternative embodiment, it is possible to choose to bleed away energy via the pressure-limiting valve 224, even without the energy storage means being full. For example, it is possible to choose to bleed away excess energy from another subsystem, see for example FIG. 5, via the pressure-limiting valve 224.

According to yet another alternative embodiment the method comprises the steps of detecting an input from an operator (such as the driver), which input is indicative of the fact that energy is to be regenerated, and of controlling the pressure on the tank side of the hydraulic machine correspondingly. More specifically, the position of a lever that is operated by the driver is detected. In the event of a movement of the lever from a basic position in a direction that indicates lowering of the load, a corresponding signal is generated. Such a signal from the lever and a signal from the energy storage means should preferably both be received, in order for the pressure-limiting valve to be caused to increase the pressure on the tank side.

According to yet another alternative, or in addition, the method comprises the step of detecting a pressure in the first line 210, of comparing the detected pressure value with a predetermined value, and of increasing the pressure on the tank side of the hydraulic machine 204 if the detected pressure value exceeds the predetermined value. In this case, the predetermined pressure value gives an indication of the fact that an energy-recovering movement is being carried out.

According to yet another alternative, or in addition, the method comprises the step of detecting a direction of movement of the hydraulic cylinder 108,109, and of controlling the pressure on the tank side of the hydraulic machine 204 if the detected direction corresponds to the hydraulic cylinder being driven by the load.

Figure 11:
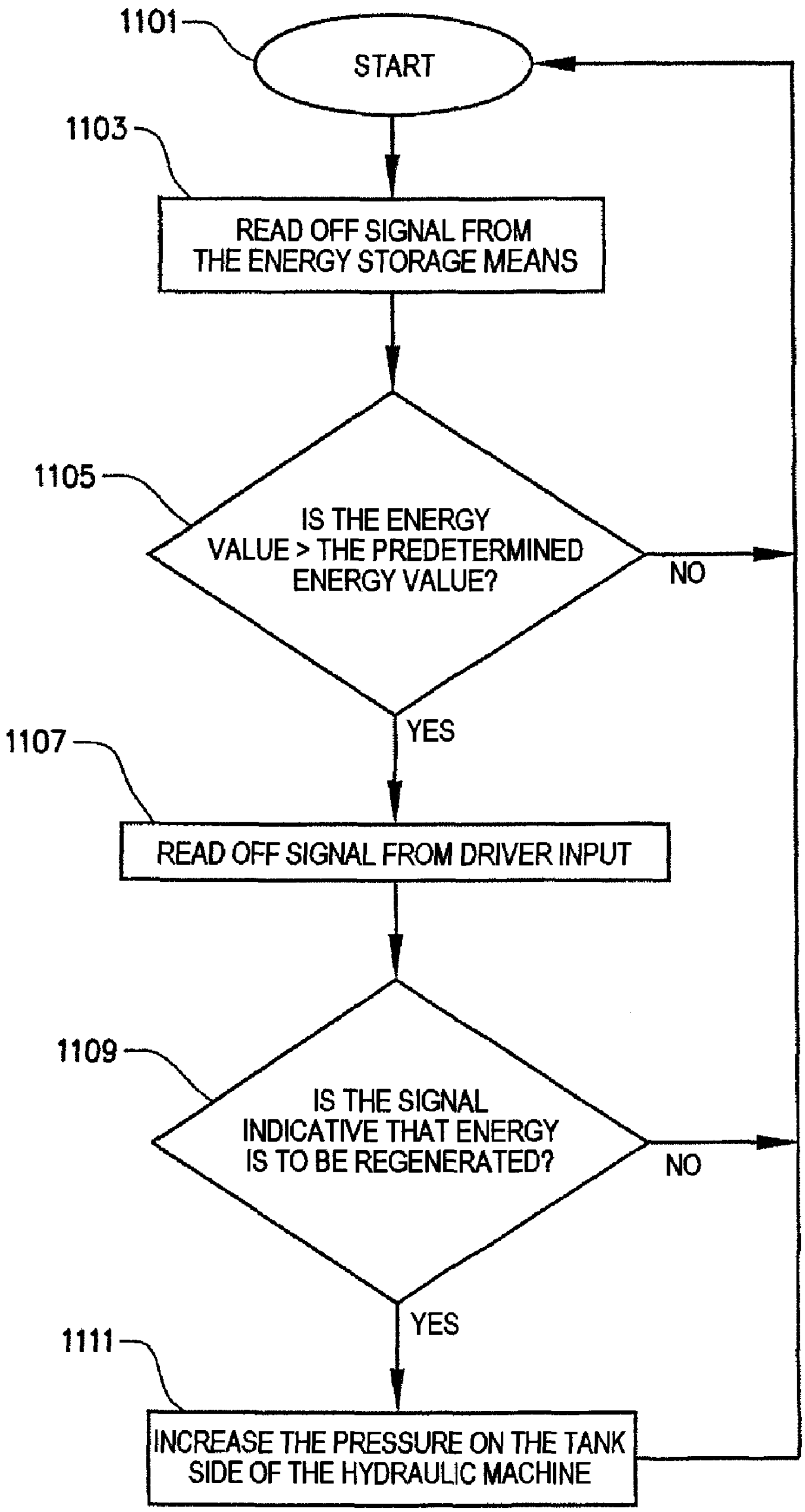
FIG. 11 shows a flow diagram for energy recovery, according to a first example.

FIG. 11 illustrates a flow diagram for the logic circuit for the regeneration of energy. The logic circuit commences at the initial block 1101. The control unit then continues to block 1103, where a signal from the energy storage device is read off. In the next block 1105, the detected energy value is compared with a predetermined energy value. If the detected energy value is greater than the predetermined pressure value, the logic circuit continues to block 1107. In block 1107, a signal from the driver is read off. In the next block 1109, it is determined whether the detected driver input is an indication to the effect that energy is to be regenerated. If this is the case, a signal is sent to the electrically controlled pressure-limiting valve 224 so that it increases the pressure on the piston-rod side of the hydraulic cylinder, see block 1111.

A computer monitors the position of the cylinder 108 via the position sensor 248 and monitors the cylinder's load via the pressure sensor 228. Alternatively, the load on the cylinder 108 can be calculated on the basis of the electrical energy that is required to retard the load. The control unit 802 also monitors how much energy is in the energy storage means 820. The control unit 802 now calculates how much energy the function generates if lowering is completely carried out. This calculation is compared with how much energy can be regenerated in the energy storage means 820. On the basis of this, the computer can determine when a reduction of energy is to commence and how large it is to be.

Figure 12:
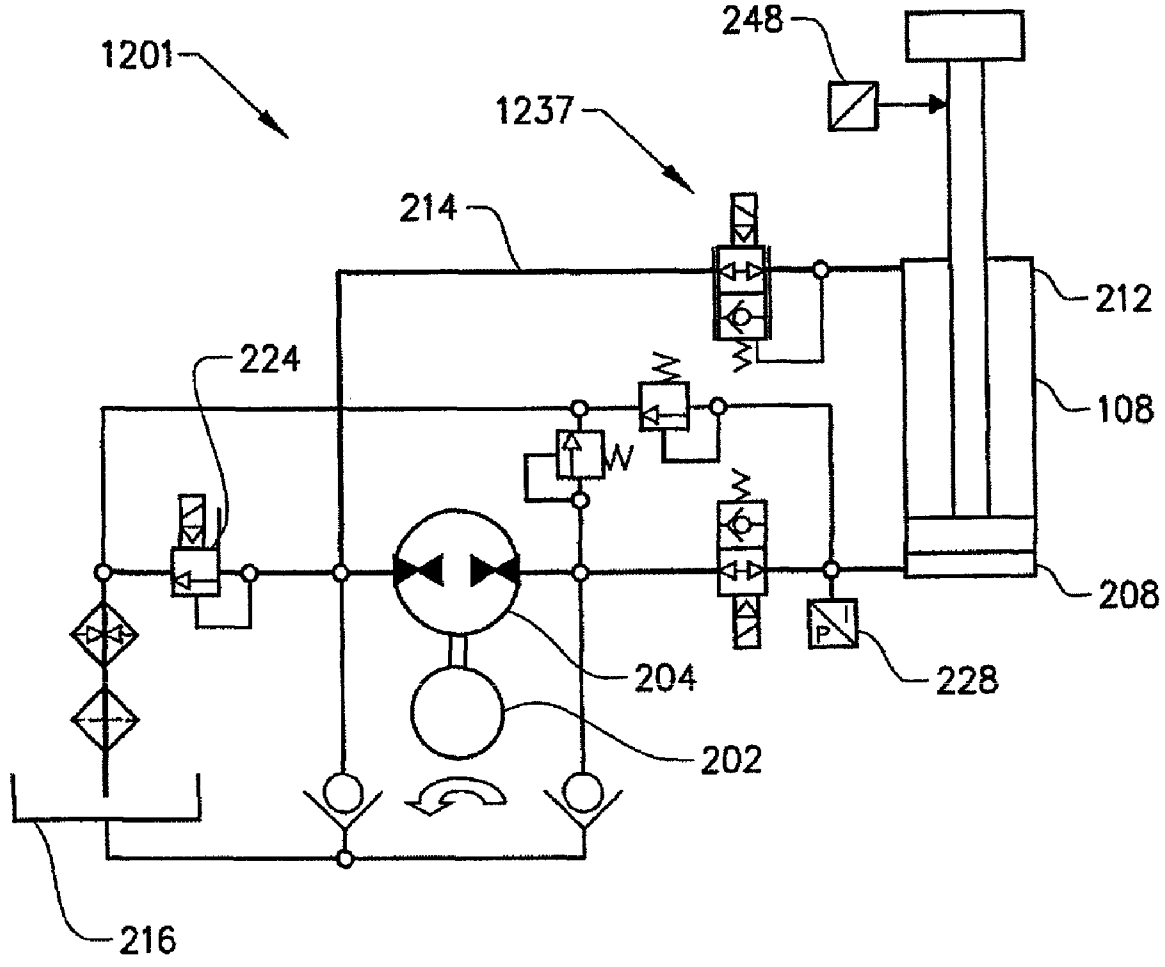
FIGS. 12-14 show three additional embodiments of the control system.

FIG. 12 shows a variant 1201 of the control system according to FIG. 2. The valve 1237 on the line 214 that is connected to the piston-rod side of the hydraulic cylinder 108 is variably adjustable. More specifically, the valve 1237 consists of or comprises a pilot-controlled pressure-reducing valve. With this system, all the energy can be dumped to heat in the oil.

In the event of a lowering of the load, refilling of the piston-rod side 212 can be carried out as a result of the pilot-controlled pressure-reducing valve 1237. The pressure in the piston-rod side 212 can then be adjusted to a level approaching zero during the lowering phase. The flow and pressure drop across the valve 1237 then generate heat in the oil. The remainder of the oil (=piston volume−piston rod volume) passes via the pilot-controlled pressure-limiter 224 to the tank and its energy can be reduced via the pressure drop that is set for the valve.

How much energy is to be reduced can be controlled via the pressure-reducing valve 1237 and the pressure-limiting valve 224. By increasing the pressure level for the pressure-limiting valve 224, it is possible to cause the pump/motor to consume energy instead of regenerating energy. This can be useful if an energy store 820 needs to be temporarily emptied to some extent. The speed of the electrical motor determines the speed of the cylinder.

According to the embodiment in FIG. 12, the control unit 802 keeps check on how much energy is in the energy store 820. If it starts to approach the maximum level, an energy reduction can be carried out to a level that does not result in "overloading" of the energy store.

The control system 201 according to FIG. 2 will be described in greater detail below.

The first port 220 of the hydraulic machine 204 is connected to the tank 216 via a first suction line 230. A means 232, in the form of a non-return valve, is adapted to allow suction of hydraulic fluid from the tank and obstruction of a hydraulic fluid flow to the tank through the suction line 230.

The second port 222 of the hydraulic machine 204 is connected to the tank 216 via a second suction line 234. A means 236, in the form of a non-return valve, is adapted to allow suction of hydraulic fluid from the tank and obstruction of a hydraulic fluid flow to the tank through the suction line 234.

A means 237 for opening/closing is arranged on the second line 214 between the second port 222 of the hydraulic machine 204 and the piston-rod end 212 of the hydraulic cylinder 108. This means 237 comprises an electrically controlled valve with two positions. In a first position, the line 214 is open for flow in both directions. In a second position, the valve has a non-return valve function and allows flow in only the direction toward the hydraulic cylinder 108. During lifting movement, the electric valve 237 is opened and the rotational speed of the electric machine 202 determines the speed of the piston 218 of the hydraulic cylinder 108. Hydraulic fluid is drawn from the tank 216 via the second suction line 234 and is pumped to the piston side 208 of the hydraulic cylinder 108 via the first line 210.

An additional line 242 connects the second port 222 of the hydraulic machine 204 and the tank 216.

A means 243 for opening/closing is arranged on the first line 210 between the first port 220 of the hydraulic machine 204 and the piston end 208 of the hydraulic cylinder 108. This means 243 comprises an electrically controlled valve with two positions. In a first position, the line 210 is open for flow in both directions. In a second position, the valve has a non-return valve function and allows flow in only the direction toward the hydraulic cylinder 108.

If the bucket 107 should stop suddenly during a lowering movement (which can happen if the bucket strikes the ground), the hydraulic machine 204 does not have time to stop. In this state, hydraulic fluid can be drawn from the tank 216 via the suction line 230 and on through the additional line 242.

The electrically controlled valves 237, 243 function as load-holding valves. They are closed in order that electricity is not consumed when there is a hanging load and also in order to prevent dropping when the drive source is switched off. According to an alternative, the valve 237 on the piston-rod side 212 is omitted. However, it is advantageous to retain the valve 237 because external forces can lift the lifting arm 106.

A filtering unit 238 and a heat exchanger 240 are arranged on the additional line 242 between the second port 222 of the hydraulic machine 204 and the tank 216. An additional filtering and heating flow can be obtained by virtue of the hydraulic machine 204 driving a circulation flow from the tank 216 first via the first suction line 230 and then via the additional line 242 when the lifting function is in a neutral position. Before the tank, the hydraulic fluid thus passes through the heat exchanger 240 and the filter unit 238.

There is another possibility for additional heating of the hydraulic fluid by pressurizing the electrically controlled pressure limiter 224 at the same time as pumping-round takes place to the tank in the way mentioned above. This can of course also take place when the lifting function is used.

A first pressure-limiting valve 245 is arranged on a line which connects the first port 220 of the hydraulic machine 204 to the tank 216. A second pressure-limiting valve 247 is arranged on a line which connects the piston side 208 of the hydraulic cylinder 108 to the tank 216. The two pressure-limiting valves 245, 247 are connected to the first line 210 between the hydraulic machine 204 and the piston side 208 of the hydraulic cylinder 108 on different sides of the valve 243. The two pressure-limiting valves 245, 247, which are also referred to as shock valves, are spring-loaded and adjusted to be opened at different pressures. According to an example, the first pressure-limiting valve 245 is adjusted to be opened at 270 bar, and the second pressure-limiting valve 247 is adjusted to be opened at 380 bar.

When the work machine 101 is driven toward a heap of gravel or stones and/or when the implement is lifted/lowered/tilted, the movement of the bucket may be counteracted by an obstacle. The pressure-limiting valves 245, 247 then ensure that the pressure is not built up to levels which are harmful for the system.

According to a first example, the bucket 107 is in a neutral position, that is to say stationary in relation to the frame of the front vehicle part 102. When the wheel loader 101 is driven toward a heap of stones, the second pressure limiter 247 is opened at a pressure of 380 bar.

During ongoing lowering, the valve 243 on the first line 210 between the hydraulic machine 204 and the piston side 208 of the hydraulic cylinder 108 is open. When the lifting arm 106 is lowered, the first pressure limiter 245 is opened at a pressure of 270 bar. If an external force should force the loading arm 106 upward during a lowering operation with power down, the pressure limiter 224 on the line 226 between the second port 222 of the hydraulic machine 204 and the tank 216 is opened.

According to an alternative to the pressure-limiting valves 245, 247 being adjusted to be opened at a predetermined pressure, the pressure-limiting valves can be designed with variable opening pressure. According to a variant, the pressure-limiting valves 245, 247 are electrically controlled. If electric control is used, only one valve 247 is sufficient for the shock function. This valve 247 is controlled depending on whether the valve 243 is open or closed. The opening pressure can be adjusted depending on activated or non-activated lifting/lowering function and also depending on the cylinder position.

Figure 3:
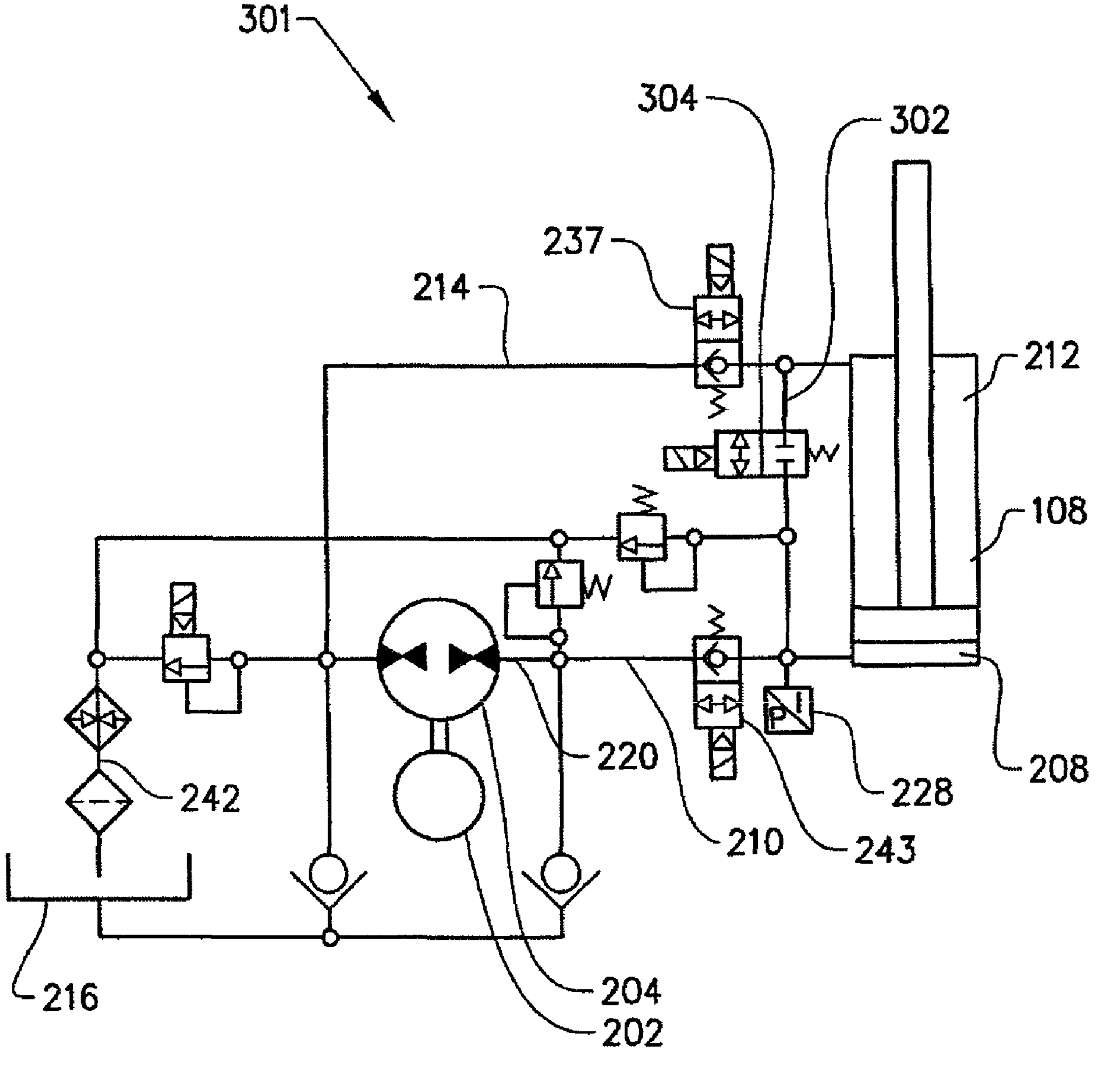

FIG. 3 shows a second embodiment of the control system 301. Here, the first port 220 of the hydraulic machine 204 is connected to the piston-rod side 212 of the hydraulic cylinder 108 via a line 302 which connects the piston-rod side 212 and the piston side 208 of the hydraulic cylinder 108 in parallel to the hydraulic machine 204. A means 304 for flow control, in the form of an electrically controlled on/off valve, is arranged on said parallel line 302 in order to control the flow communication between the piston-rod side 212 and the piston side 208. By virtue of the valve 304, the maximum flow via the hydraulic machine 204 can be lowered, that is to say the pump displacement can be reduced or a lower maximum speed can be used.

Figure 4:
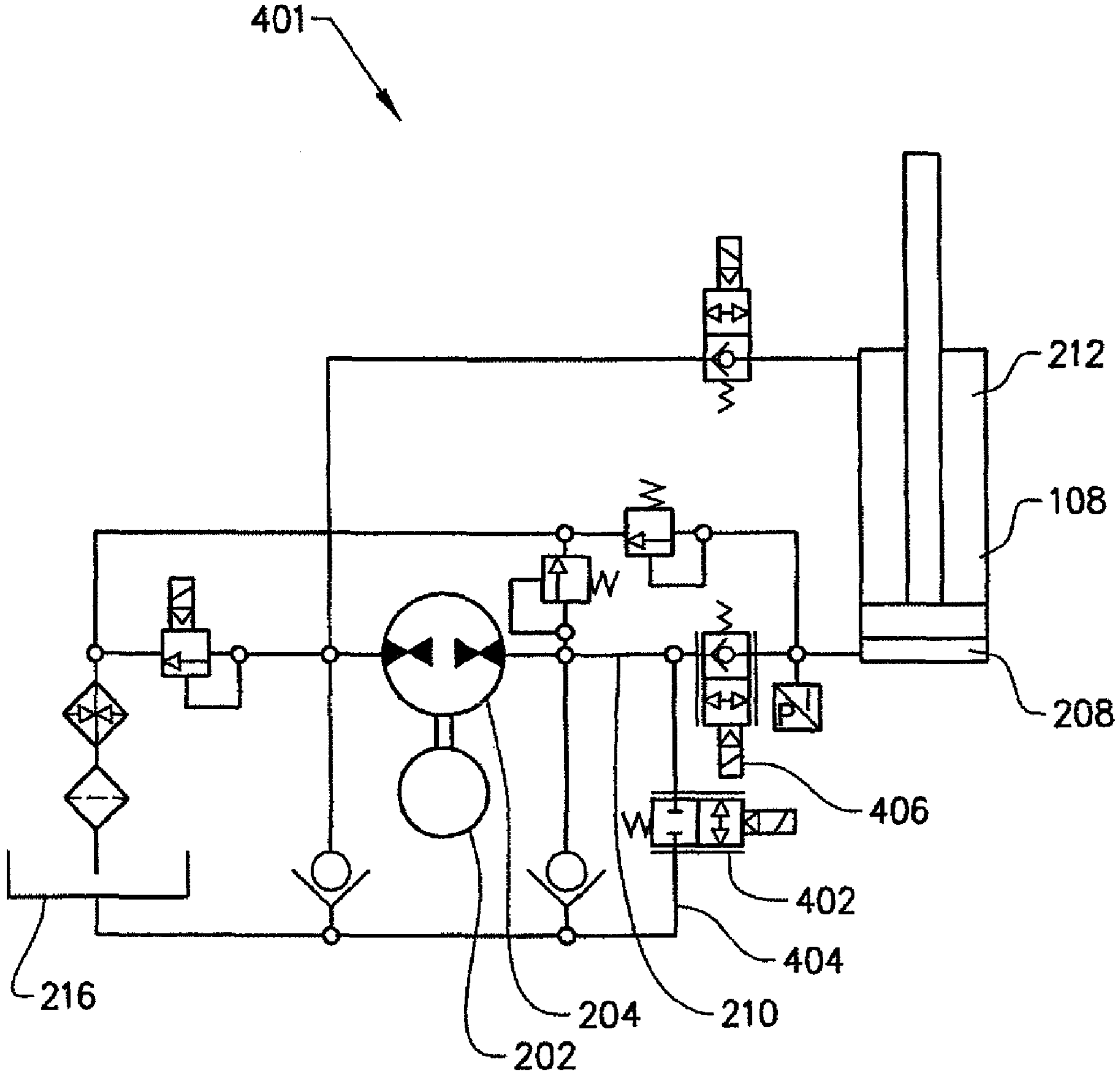

FIG. 4 shows a third embodiment of the control system 401. A flow control means 402, in the form of an electrically controlled proportional valve, is connected on a line 404 which extends between the first line 210 and the tank 216 in order to allow a certain leakage flow from the hydraulic machine 204 to the tank at the start of a lifting movement. The hydraulic machine 204 thus has a certain basic revolution before lifting takes place. This reduces starting friction. The valve 402 can then be closed gradually the greater the lifting speed becomes. The valve 402 is a small valve which only produces an adequate drainage flow so that the hydraulic machine 204 starts working before the cylinder movement starts.

A flow control means 406, in the form of an electrically controlled proportional valve, is connected on the first line 210 between the hydraulic machine 204 and the piston side 208 of the hydraulic cylinder in order to control the size of the hydraulic fluid flow from the hydraulic cylinder 108 to the hydraulic machine 204 at the start of a lowering movement. At the start of the lowering movement, the electric machine 202 has a low counter-torque in order to prevent starting friction and a jerky start. The valve 406 is opened proportionally and the piston speed is controlled. In parallel with the valve 406 being opened, the counter-torque in the electric machine 202 is increased and the hydraulic machine 204 gradually takes over the speed control of the lowering movement. In the end, the valve 406 is fully open and the lowering speed is controlled completely by the electric machine 202.

Figure 5:
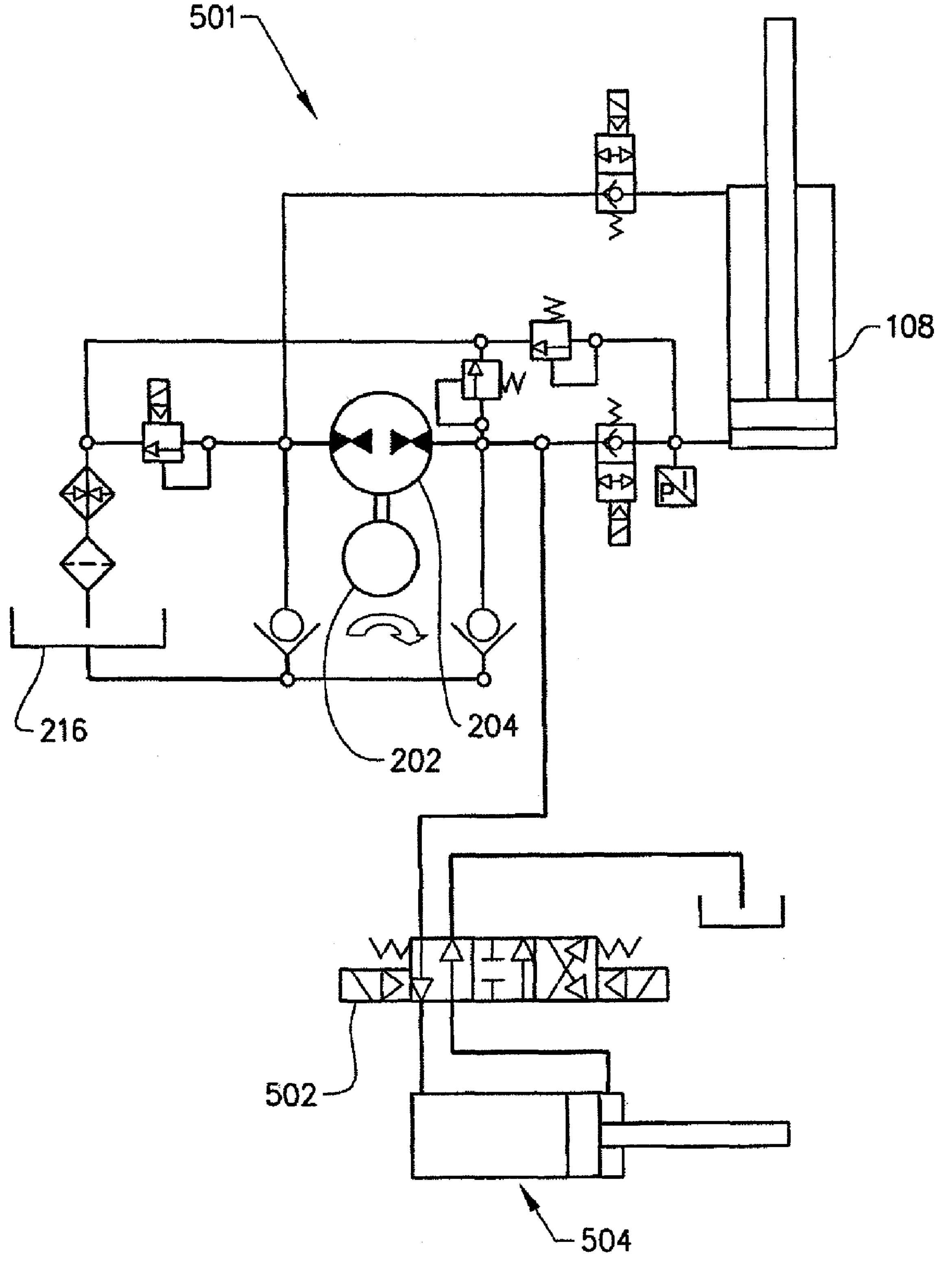

FIG. 5 shows a fourth embodiment of the control system 501. The hydraulic machine 204 can be connected via a connection means 502 to an additional hydraulic actuator 504 which is adapted to perform a work function which is separate from a work function performed by said hydraulic cylinder 108. Here, the connection means 502 consists of or comprises an electrically controlled directional valve. The additional work function can be, for example, implement locking or an emergency pump for the steering function.

Figure 6:
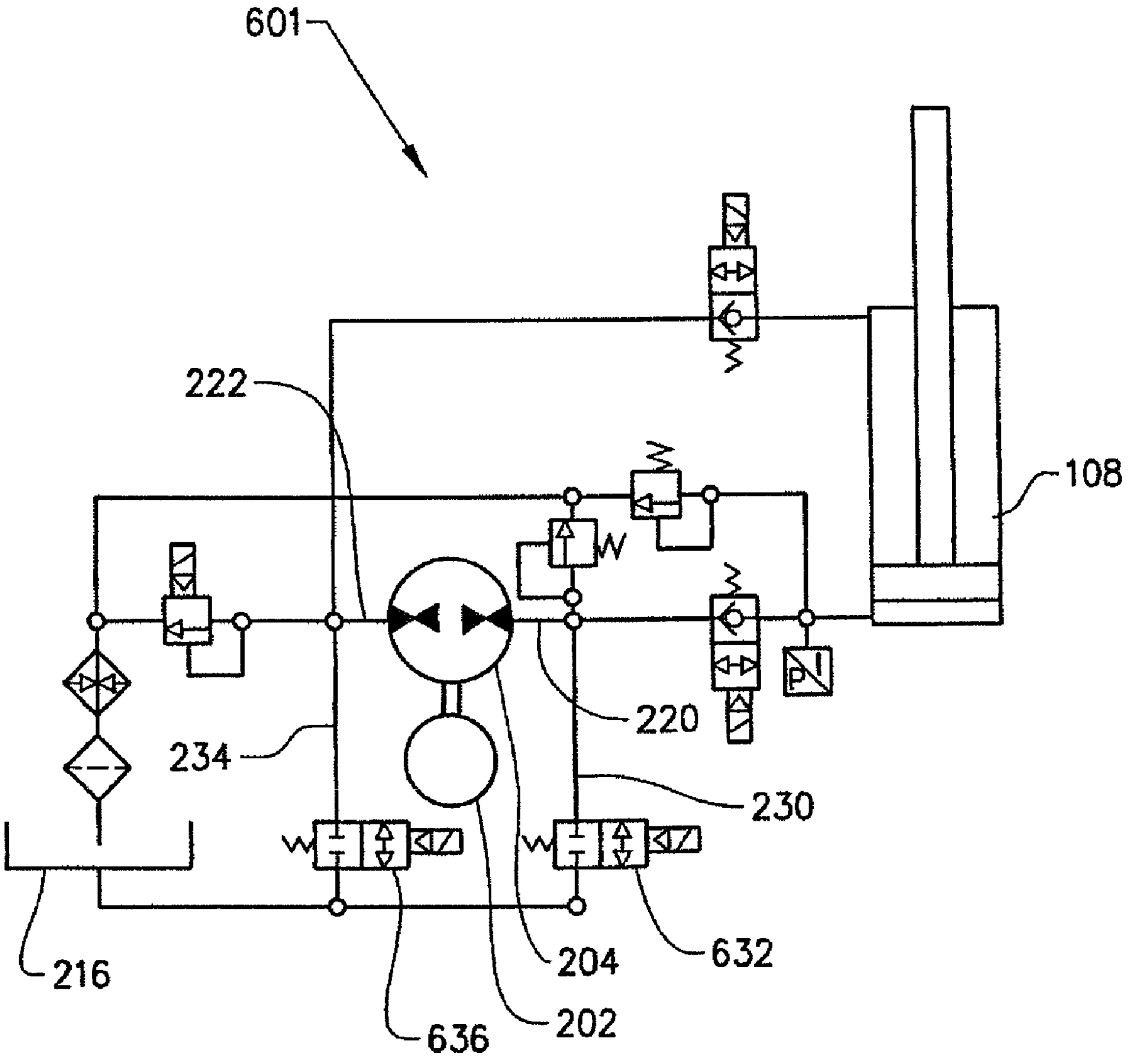

FIG. 6 shows a fifth embodiment of the control system 601, which is a development of the first embodiment, see FIG. 2. Here, said means for allowing suction of hydraulic fluid from the tank 216 through the suction lines 230, 234 consist of or comprise electrically controlled on/off valves 632, 636 instead of non-return valves. This reduces problems of cavitation on the suction side.

According to an alternative, one or both of the valves 632, 636 is pilot-controlled. The pilot control can, for example, be achieved via a hydraulic signal or an electrical signal.

The valve 636 which connects the second port 222 of the hydraulic machine 204 to the tank 216 can be open when the hydraulic machine rotates in the direction so that hydraulic fluid passes to the cylinder 108. The valve 636 is closed when the rotation is changed.

The valve 632 which connects the first port 220 of the hydraulic machine 204 to the tank 216 is opened when the filtering and heating flow is run. The valve 636 may also need to be opened if the unit stops dead during ongoing lowering, which results in cavitation occurring on account of the fact that the hydraulic machine 202 does not have time to stop. Such a course of events can be registered by, for example, registering the state of the hydraulic machine 202 and the state of the cylinder 108.

Figure 7:
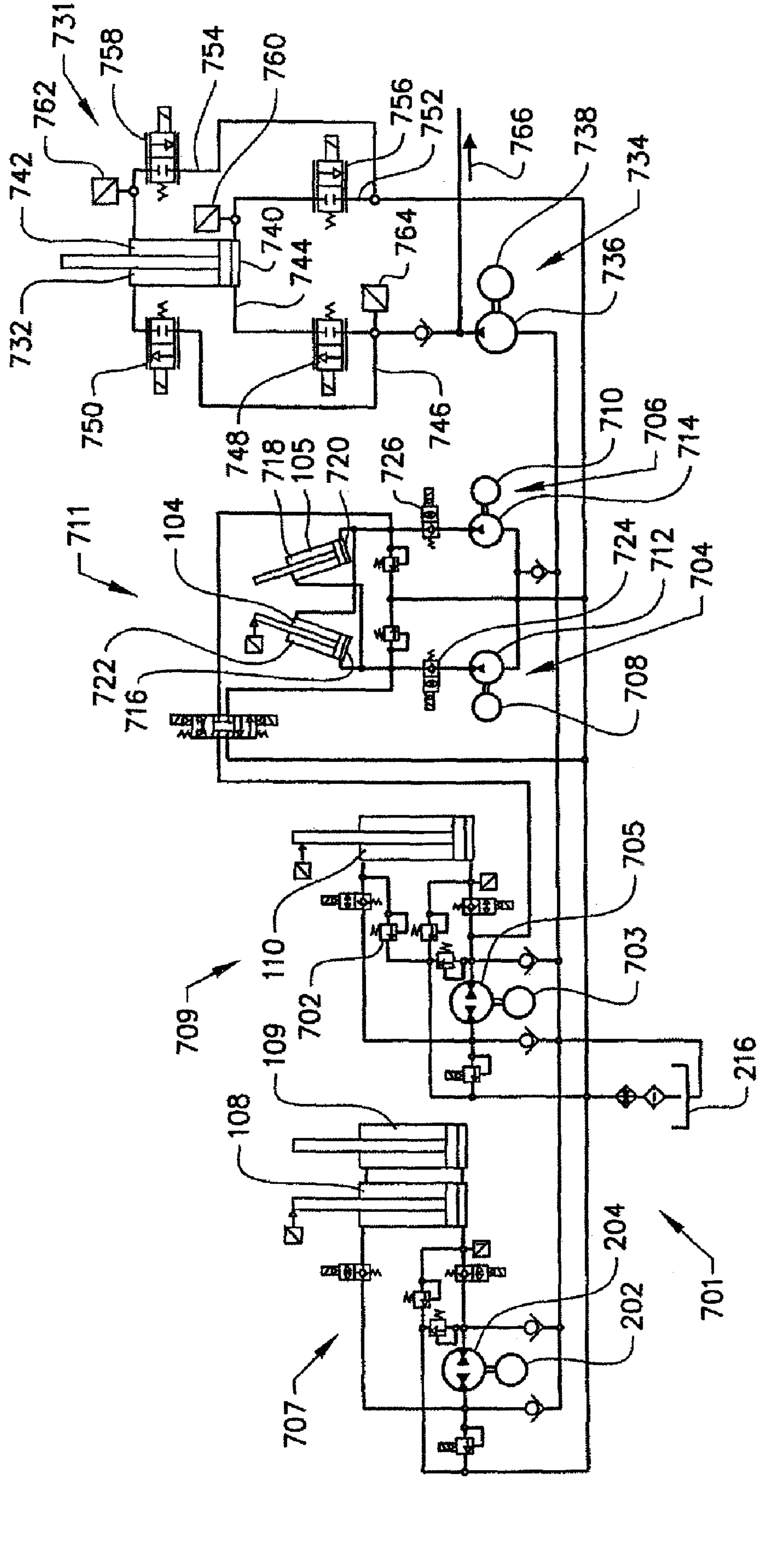
FIG. 7 shows an embodiment of a control system for controlling a number of functions of the wheel loader.

FIG. 7 shows a control system 701 comprising a subsystem 707 for the lifting function, a subsystem 709 for the tilting function, a subsystem 711 for the steering function and a subsystem 731 for an additional function. A number of different system embodiments for the lifting function have been described above.

The subsystem 709 shown in FIG. 7 for the tilting function has a construction corresponding to the system for the lifting function. FIG. 7 illustrates the electric machine with reference sign 703 and the hydraulic machine with reference sign 705. For the tilting function, a pressure-limiting valve 702, or shock valve, is added, which connects the piston-rod side of the tilting cylinder 110 to the tank.

The subsystem 711 shown in FIG. 7 for the steering function comprises said first and second steering cylinders 104, 105, which are adapted for frame-steering the wheel loader 101. The system also comprises a first drive unit 704 and a second drive unit 706, which each comprise an electric machine 708, 710 and a hydraulic machine 712, 714. Each electric machine 708, 710 is connected in a driving manner to its associated hydraulic machine 712, 714.

A first 712 of the two hydraulic machines is connected to a piston side 716 of the first hydraulic cylinder 104 and a piston-rod side 718 of the second hydraulic cylinder 105. A second 714 of the two hydraulic machines is connected to a piston side 720 of the second hydraulic cylinder 105 and a piston-rod side 722 of the first hydraulic cylinder 104.

For steering the wheel loader 101 in a direction (for example to the right), a first of the hydraulic machines 712 is adapted to be driven by its associated electric machine 708 and to supply the hydraulic cylinders 104, 105 with pressurized hydraulic fluid from the tank 216, and the second hydraulic machine 714 is adapted to be driven by a hydraulic fluid flow from the hydraulic cylinders 104, 105 and to drive its associated electric machine 710, and vice versa.

The hydraulic machines are therefore driven in opposite directions during operation.

A first electrically controlled control means (control valve) 724 is arranged between the hydraulic machine 712 of the first drive unit 704 and the steering cylinders 104, 105, and a second electrically controlled control means (control valve) 726 is arranged between the hydraulic machine 714 of the second drive unit 706 and the steering cylinders 104, 105.

The subsystem 731 shown in FIG. 7 for the additional function preferably comprises only one drive unit 734 for providing all the additional functions. This means that it is easier to add an additional function, see arrow 766, as only a valve unit has to be added. The drive unit 734 comprises a pump 736 which is driven mechanically by an electric motor 738. This additional function can consist of or comprise, for example, the implement 107 comprising parts which are movable relative to one another, the movement of which is controlled. Such functions can consist of or comprise a sweeping roller, clamping arms etc.

A hydraulic actuator in the form of a hydraulic cylinder 732 is adapted for carrying out the movement in the control system 731 shown. The pump 736 is connected to a piston side 740 and a piston-rod side 742 via a first and a second line 744, 746. An inlet valve in the form of an electrically controlled proportional valve 748, 750 is arranged on each of the first and second lines 744, 746. The piston side 740 and the piston-rod side 742 are connected to the tank 216 via a third and fourth line 752, 754. An outlet valve in the form of an electrically controlled proportional valve 756, 758 is arranged on each of the third and fourth lines 752, 754. A pressure sensor 760, 762 is arranged on each of the third and fourth lines 752, 754. An additional pressure sensor 764 is arranged on the line downstream of the pump 736 and upstream of the inlet valves 748, 750.

According to an alternative, more pumps and if appropriate electric motors can be added for the purpose of increasing the maximum flow. The pump for the lifting or the tilting function can moreover be connected in parallel for any topping of the flow. Functions with another type of valve can also be added.

The additional function can be controlled via inlet control: on activation of a function, the load pressure in the cylinder 732 is registered. The pump 736 is set with a torque which gives a certain level of higher pressure before the inlet valve 748, 750, which is registered via the pressure sensor 764 before the valve. This means that the inlet valve 748, 750 has a known pressure drop. By virtue of the fact that the pressure drop can be read off, the flow can now be adjusted via control of the inlet valve (regulating the opening area). If a number of functions are running at the same time, the pump 736 builds up a torque which is a certain level higher than the highest registered load pressure. The outlet valve 756, 758 opens to a level which gives a specific counter-pressure, which can be read off via the pressure sensor 760, 762 on the outlet side of the cylinder 732. If the counter-pressure is higher on account of a hanging load, the outlet valve 756, 758 is regulated so that the pressure on the inlet side does not fall below a certain level. Functions which have a motor instead of a cylinder can be regulated in the same way.

The additional function can alternatively be controlled via outlet control: the pump 736 is set with a torque which gives a certain pressure level before the outlet valve 756, 758, which is registered via the pressure sensor 760, 762 before the outlet valve. This means that the outlet valve 756, 758 has a pressure drop which is known (the tank side is in principle pressureless). According to an alternative/supplement, a pressure sensor is arranged on the tank side. It is then possible to have control of the pressure drop across the valve (in some cases the system is not pressureless).

By virtue of the fact that the pressure drop can be read off, the flow can now be adjusted via control of the outlet valve 756, 758 (regulating the opening area). If a number of functions are running at the same time, the pump builds up a torque which gives a certain level of pressure at the pressure sensor (on the outlet side) which has the lowest pressure.

The inlet valve 748, 750 can be opened fully so that no pressure drop occurs (lower losses). If it is hanging load, the cylinder 732 drives, or if a pump flow deficiency occurs, the outlet valve 756, 758 is also regulated so that the pressure on the inlet side of the cylinder 732 does not fall below a certain level. Prioritizing/weighting can take place between the functions is the pump flow is not sufficient.

Functions which have a motor instead of a cylinder can be regulated in the same way.

If use is made of a function which has a hydraulic motor (for example a sweeping roller), both the inlet valve 748, 750 and the outlet valve 756, 758 can be opened fully so that no pressure drop is generated. The speed of the sweeping roller is then controlled directly via the speed of the pump 736. If another function is temporarily controlled simultaneously, it is possible to change over temporarily to inlet control or outlet control.

The control system 731 affords opportunities for a maximum feed pressure limitation. The pressure can be read off via the pressure sensor, and the inlet valve can be throttled when the pressure becomes too high.

The control system 731 also affords opportunities for dealing with a shock pressure. The pressure can be read off via pressure sensor, and the outlet valve can drain to the tank when the pressure level becomes too high.

According to a development, a back-up valve can be added after the valve 756, 758 on the outlet side (toward the tank 216), together with refilling valves for the cylinder 732. This provides more available pump flow when a number of functions are running simultaneously and then if a function has a load which drives the flow.

Figure 8:
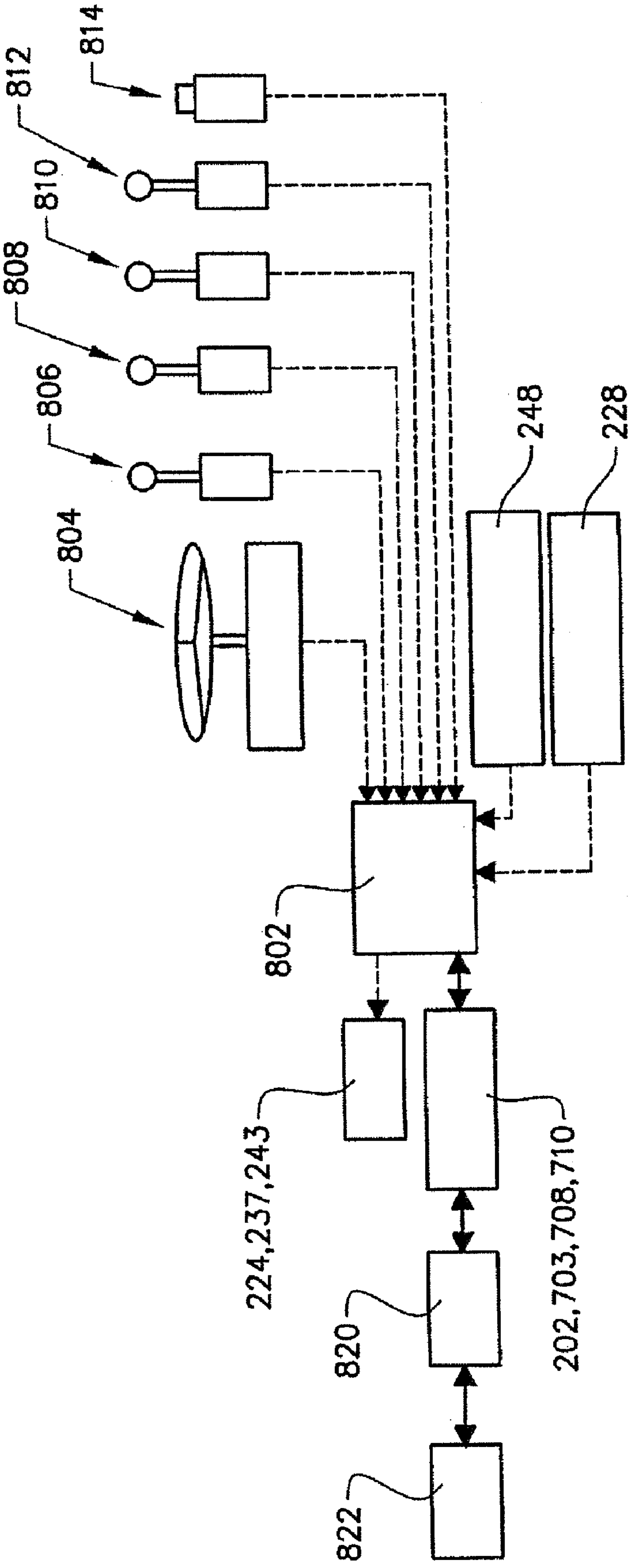
FIG. 8 shows a control system for controlling one or more of the functions of the wheel loader.

FIG. 8 shows a control system for controlling the control system 701 shown in FIG. 7 for the lifting function, the tilting function, the steering function and the additional function. A number of elements, or controls, 804, 806, 808, 810, 812, 814 are arranged in the cab 114 for manual operation by the driver and are electrically connected to the control unit 802 for controlling the various functions. A wheel 804 and a control lever 806 are adapted for controlling the steering function. A lifting lever 808 is adapted for the lifting function and a tilting lever 810 is adapted for the tilting function. A lever 812 is adapted for controlling the third function, and an additional control 814 is adapted for pump control (adjustable flow) for the third function. A number of additional functions with associated controls can be added.

The electric machines 202, 703, 708, 710, 738 are electrically connected to the control unit 802 in such a way that they are controlled by the control unit and that they can provide operating state signals to the control unit.

The control system comprises one or more energy storage means 820 connected to one or more of said electric machines 202, 703, 708, 710, 738. The energy storage means 820 can consist of or comprise a battery or a supercapacitor, for example. The energy storage means 820 is adapted to provide the electric machine with energy when the electric machine 202 is to function as a motor and drive its associated pump 204. The electric machine 202 is adapted to charge the energy storage means 820 with energy when the electric machine 202 is driven by its associated pump 204 and functions as a generator.

The wheel loader 101 also comprises a power source 822 in the form of an internal combustion engine, which usually comprises a diesel engine, for propulsion of the vehicle. The diesel engine is connected in a driving manner to the wheels of the vehicle via a drive line (not shown). The diesel engine is moreover connected to the energy storage means 820 via a generator (not shown) for energy transmission.

It is possible to imagine alternative machines/units adapted for generating electric power. According to a first alternative, use is made of a fuel cell which provides the electric machine with energy. According to a second alternative, use is made of a gas turbine with an electric generator for providing the electric machine with energy.

FIG. 8 also shows the other components which are connected to the control unit 802 according to the first embodiment of the control system for the lifting function, see FIG. 2, such as the electrically controlled valves 224, 237, 243, the position sensor 248 and the pressure sensor 228. It will be understood that corresponding components for the tilting function and the steering function and the additional function are connected to the control unit 802.

Figure 9:
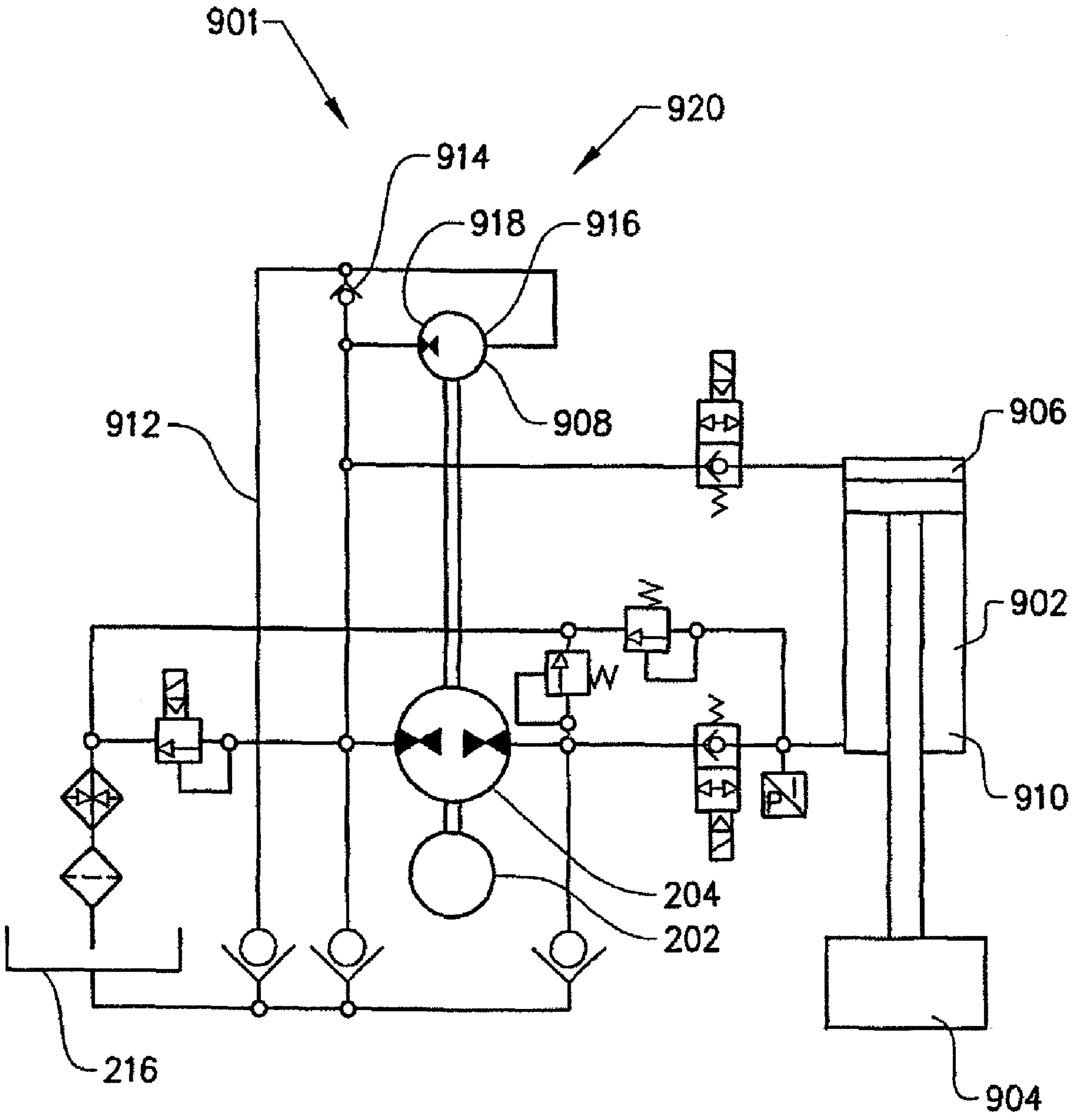
FIG. 9 shows a further embodiment of the control system for controlling a work function of the wheel loader.

FIG. 9 shows a further embodiment of the control system 901. The control system 901 comprises a hydraulic cylinder 902 which is reversed, which means that a load 904 draws the cylinder out via its weight. This control system 901 can be said to be a variant of the control system 201 according to the first embodiment, see FIG. 2.

In order to bring about necessary refilling to the piston side 906 of the cylinder 902 during a lowering movement, the system comprises an additional, smaller pump 908. The smaller pump has a driving connection to the hydraulic machine 204.

During lowering, the hydraulic fluid passes from the piston-rod side 910 of the cylinder 902 to the piston side 906 via the larger hydraulic machine 204. The small pump 908 contributes to pumping hydraulic fluid from the tank 216 to the piston side 906 via a suction line 912. During a lifting movement, the small pump 908 performs no useful work. The small pump 908 only pumps hydraulic fluid round through itself via a small nonreturn valve 914. The non-return valve 914 is therefore connected between an inlet side 916 and an outlet side 918 of the additional pump 908, so that, during a lifting movement, the pump 908 only pumps hydraulic fluid in a circuit 920 comprising the non-return valve 914. The non-return valve 914 is therefore arranged in parallel with the small pump 908.

Otherwise, this system 901 functions similarly to the basic system (see FIG. 2), apart from the filtering and heating flow being a little greater.

Figure 13:
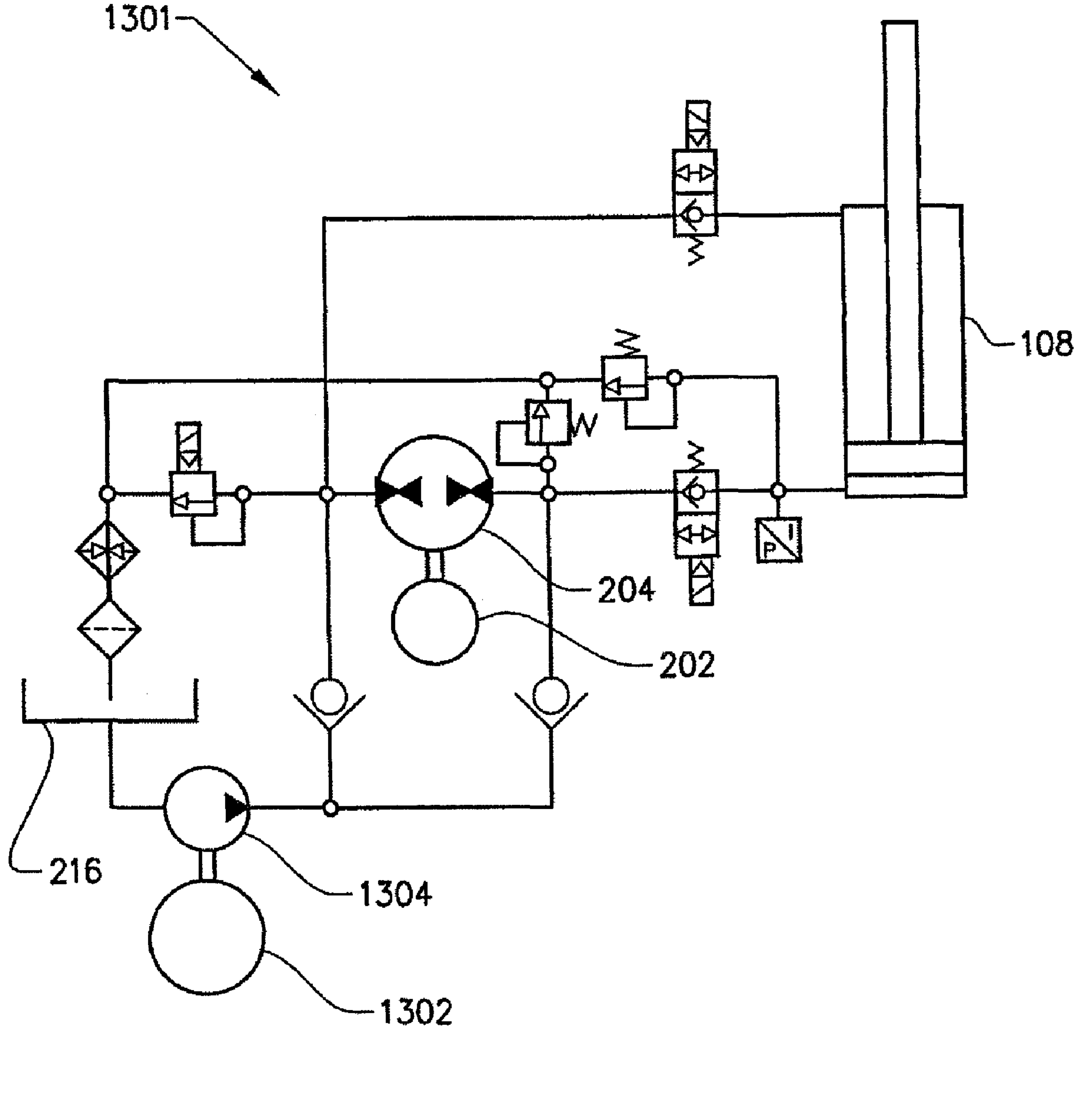
Figure 14:
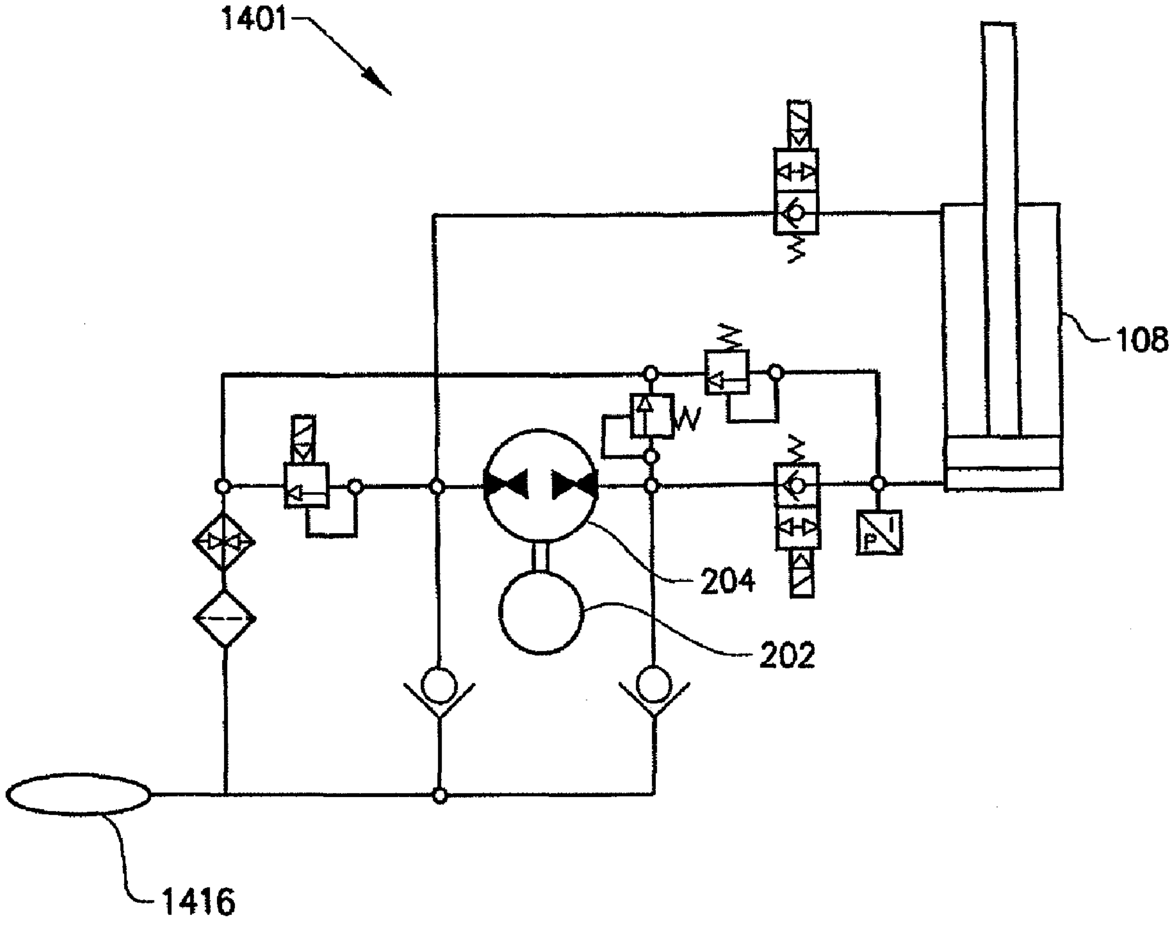

FIGS. 13 and 14 show two variants 1301, 1401 of the first embodiment in FIG. 2.

The control system 1301 according to FIG. 13 comprises an additional pump 1304 of any type, that is arranged to generate a feed pressure from the tank 216. The control system 1401 according to FIG. 14 comprises a pressurized tank in the form of an accumulator 1416. The accumulator 1416 is arranged to generate a feed pressure. The term "tank" is thus to be interpreted in its widest sense and comprises various types of collecting vessels that can be pressurized, such as an accumulator.

The variants 1301 and 1401 of the control system provide increased refilling in the cylinder 108. In addition, the main unit (pump/motor) 202, 204 can be smaller and can be driven at a higher speed. In addition, the heat exchanger, filter, tank and feed pump can be common to several work functions.

The invention is not to be regarded as being limited to the illustrative embodiments described above, but a number of further variants and modifications are conceivable within the scope of the following patent claims.

The invention claimed is:

1. A control system for a work machine comprising an electric machine, a hydraulic machine and at least one hydraulic cylinder, the electric machine being connected in a driving manner to the hydraulic machine, the hydraulic machine being connected to a piston side of the hydraulic cylinder via a first line and a piston-rod side of the hydraulic cylinder via a second line, the hydraulic machine being adapted to be driven by the electric machine and supply the hydraulic cylinder with pressurized hydraulic fluid from a tank in a first operating state and to be driven by a hydraulic fluid flow from the hydraulic cylinder and drive the electric machine in a second operating state, wherein the system comprises means for controlling pressure, which pressure means is arranged on a line between the hydraulic machine and the tank in order to achieve a pressure build-up between the hydraulic machine and the pressure means.

2. The control system as claimed in claim 1, wherein the hydraulic machine is adapted to control a speed of the piston of the hydraulic cylinder in the first operating state.

3. The control system as claimed in claim 1, wherein the control system comprises a control unit which is electrically connected to the electric machine in order to control a speed of the piston of the hydraulic cylinder in the first operating state by controlling the electric machine.

4. The control system as claimed in claim 1, wherein the hydraulic machine has a first port which is connected to the piston side of the hydraulic cylinder via the first line and a second port which is connected to the piston-rod side of the hydraulic cylinder via the second line.

5. The control system as claimed in claim 4, wherein the hydraulic machine is arranged to be driven in two different directions, with one direction being associated with a flow out from the first port and the second direction being associated with a flow out from the second port.

6. The control system as claimed in claim 5, wherein the system comprises means for controlling pressure, which pressure means is arranged on a line between the second port of the hydraulic machine and the tank in order to allow pressure build-up on the piston-rod side.

7. The control system as claimed in claim 4, wherein the system comprises a means for controlling pressure, which pressure means is arranged on a line between the second port of the hydraulic machine and the tank in order to allow pressure build-up on the piston-rod side.

8. The control system as claimed in claim 4, wherein a first port of the hydraulic machine is connected to the piston-rod side of the hydraulic cylinder.

9. The control system as claimed in claim 1, wherein a second port of the hydraulic machine is connected to the tank in order to allow the hydraulic machine, in the first operating state, to draw oil from the tank via the second port and supply the oil to the hydraulic cylinder via a first port.

10. The control system as claimed in claim 1, wherein either the piston side or the piston-rod side is connected to the line between the hydraulic machine and the pressure means.

11. The control system as claimed in claim 10, wherein the piston-rod side is connected to the line between the hydraulic machine and pressure means.

12. The control system as claimed in claim 1, wherein the pressure control means is arranged to make possible variable setting of the pressure.

13. The control system as claimed in claim 1, wherein the pressure control means comprises an electrically controlled pressure-limiting valve.

14. The control system as claimed in claim 1, wherein the system comprises a sensor for sensing pressure on the piston side of the hydraulic cylinder.

15. The control system as claimed in claim 1, wherein a first port of the hydraulic machine is connected to the tank via a suction line.

16. The control system as claimed in claim 15, wherein means is arranged on the suction line in order to allow suction of hydraulic fluid from the tank and obstruction of a hydraulic fluid flow to the tank.

17. The control system as claimed in claim 16, wherein the means comprises a non-return valve.

18. The control system as claimed in claim 16, wherein the means comprises an electrically controlled on/off valve.

19. The control system as claimed in claim 1, wherein a port of the hydraulic machine is connected to the tank via a suction line.

20. The control system as claimed in claim 19, wherein means is arranged on the suction line in order to allow suction of hydraulic fluid from the tank and obstruction of a hydraulic fluid flow to the tank.

21. The control system as claimed in claim 20, wherein the means comprises a non-return valve.

22. The control system as claimed in claim 20, wherein the means comprises an electrically controlled on/off valve.

23. The control system as claimed in claim 1, wherein a port of the hydraulic machine is connected to the tank via a line.

24. The control system as claimed in claim 23, wherein a filtering unit is arranged on the line between the port of the hydraulic machine and the tank.

25. The control system as claimed in claim 1, wherein the hydraulic machine can be connected via a connection means to a hydraulic actuator which is adapted to perform a work function which is separate from a work function performed by the hydraulic cylinder.

26. The control system as claimed in claim 1, wherein the system comprises a line which connects the piston-rod side and the piston side of the hydraulic cylinder in parallel to the hydraulic machine.

27. The control system as claimed in claim 26, wherein the system comprises a means for flow control, which is arranged on the parallel line in order to control the flow communication between the piston-rod side and the piston side.

28. The control system as claimed in claim 1, wherein a first port of the hydraulic machine is connected to a piston side of the hydraulic cylinder via a first line, and a flow control means is connected between the first line and the tank in order to allow a certain leakage flow from the hydraulic machine to the tank at the start of a lifting movement.

29. The control system as claimed in claim 1, wherein a first port of the hydraulic machine is connected to a piston side of the hydraulic cylinder via a first line, and a flow control means is connected on the first line in order to control a size of the hydraulic fluid flow from the hydraulic cylinder to the hydraulic machine at the start of a lowering movement.

30. The control system as claimed in claim 1, wherein the hydraulic cylinder is adapted to move an implement in order to perform a work function.

31. The control system as claimed in claim 30, wherein the hydraulic cylinder comprises a lifting cylinder for moving a loading arm which is pivotably connected to a vehicle frame, the implement being arranged on the loading arm.

32. The control system as claimed in claim 30, wherein the hydraulic cylinder comprises a tilting cylinder for moving the implement, which is pivotably connected to a loading arm, which is in turn pivotably connected to a vehicle frame.

33. The control system as claimed in claim 32, wherein the tilting cylinder is adapted so that a load which acts on the tilting cylinder draws the piston rod of the tilting cylinder out via its weight.

34. The control system as a claimed in claim 33, wherein the control system comprises an additional, smaller pump, which has a driving connection to the hydraulic machine, and this additional pump is connected to the piston side of the tilting cylinder and to the tank in order to pump hydraulic fluid to the piston side during a lowering movement.

35. The control system as claimed in claim 34, wherein the control system comprises a non-return valve which is connected between an inlet side and an outlet side of the additional pump so that the pump only pumps hydraulic fluid in a circuit comprising the non-return valve during a lifting movement.

36. A control system for a work machine comprising a first subsystem for performing a first work operation and a second subsystem for performing at least one second work operation, which first subsystem comprises an electric machine, a hydraulic machine and at least one hydraulic cylinder, the electric machine being connected in a driving manner to the hydraulic machine, the hydraulic machine being connected to a piston side of the hydraulic cylinder via a first line and a piston-rod side of the hydraulic cylinder via a second line, the hydraulic machine being adapted to be driven by the electric machine and supply the hydraulic cylinder with pressurized hydraulic fluid from a tank in a first operating state and to be driven by a hydraulic fluid flow from the hydraulic cylinder and drive the electric machine in a second operating state, which second subsystem comprises a drive unit and a hydraulic actuator, the drive unit comprising an electric machine and a hydraulic machine, the electric machine being connected in a driving manner to the hydraulic machine, the hydraulic machine being adapted for flow communication with the hydraulic actuator, and a means being adapted for controlling movement of the hydraulic actuator.

37. The control system as claimed in claim 36, wherein the control means is arranged on an inlet side of the hydraulic actuator.

38. The control system as claimed in claim 36, wherein the control means is arranged on an outlet side of the hydraulic actuator.

39. The control system as claimed in claim 36, wherein the control means comprises at least one valve.

40. The control system as claimed in claim 36, wherein the control system comprises a third subsystem for frame-steering the vehicle, which third subsystem, comprises a first steering cylinder and a second steering cylinder, which steering cylinders are adapted for frame-steering the vehicle, a first drive unit and a second drive unit, which each comprise an electric machine and a hydraulic machine, each electric machine being connected in a driving manner to its associated hydraulic machine, a first of the two hydraulic machines being adapted for flow communication with a piston side of the first steering cylinder and a piston-rod side of the second steering cylinder, a second of the two hydraulic machines being adapted for flow communication with a piston side of the second steering cylinder and a piston-rod side of the first steering cylinder.

41. A method for controlling a hydraulic cylinder under the influence of a load, with a hydraulic machine being operatively connected to the hydraulic cylinder via a first line and to a tank via a second line, comprising controlling the hydraulic machine so that it is allowed to be driven by a flow of hydraulic fluid from the hydraulic cylinder, detecting an operating parameter that is indicative of a pressure on the piston side of the hydraulic cylinder, comparing the detected pressure with a predetermined level and of increasing the pressure on the piston-rod side of the hydraulic cylinder if the detected pressure is less than the predetermined level.

42. The method as claimed in claim 41, comprising partially preventing a flow in the second line from the hydraulic machine to the tank, with the piston-rod side of the hydraulic cylinder being connected to the line.

43. The method as claimed in claim 41, comprising increasing the pressure on the piston-rod side of the hydraulic cylinder to such an extent that a refilling of the piston-rod side of the hydraulic cylinder is achieved during movement of the piston of the hydraulic cylinder in the direction of the force applied by the load.

44. The method as claimed in claim 43, wherein the hydraulic cylinder is arranged on a work machine for moving an implement that is subjected to the load.

45. The method as claimed in claim 41, comprising increasing the pressure on the piston rod side of the hydraulic cylinder to such an extent that forced movement of the piston of the hydraulic cylinder is achieved in the direction of the force applied by the load.

46. The method as claimed in claim 41, comprising regenerating energy from the hydraulic machine when the hydraulic machine is driven by the flow of hydraulic fluid from the hydraulic cylinder.

47. A method for regeneration of energy during movement of a hydraulic cylinder under the influence of a load, with a hydraulic machine being operatively connected to the hydraulic cylinder via a first line and to a tank via a second line, comprising controlling the hydraulic machine so that it is allowed to be driven by a flow of hydraulic fluid from the hydraulic cylinder, detecting at least one operating parameter, and of increasing the pressure in the line between the hydraulic machine and the tank, on the basis of the detected operating parameter, in order to increase the pressure on the tank side of the hydraulic machine.

48. The method as claimed in claim 47, comprising controlling a pressure control means that is arranged on the line between the hydraulic machine and a tank, on the basis of the detected operating parameter, so that the pressure on the tank side of the hydraulic machine is increased.

49. The method as claimed in claim 48, comprising comprising regenerating energy from the hydraulic machine to an energy storage means.

50. The method as claimed in claim 49, comprising comprising regenerating energy as electrical energy via an electric machine.

51. The method as claimed in claim 49, comprising detecting an operating parameter that is indicative of a current energy level in the energy storage means, comparing the detected value for the energy level with a predetermined value, and increasing the pressure on the tank side of the hydraulic machine if the detected energy level exceeds the predetermined value.

52. The method as claimed in claim 47, wherein the pressure control means comprises an electrically controlled pressure-limiting valve.

53. The method as claimed in claim 47, comprising detecting an input from an operator, which input indicates that energy is to be regenerated, and controlling the pressure on the tank side of the hydraulic machine correspondingly.

54. The method as claimed in claim 47, comprising detecting a pressure in the first line, comparing the detected pressure value with a predetermined value, and of increasing the pressure on the tank side of the hydraulic machine if the detected pressure value exceeds the predetermined value.

55. The method as claimed in claim 47, comprising detecting a direction of movement of the hydraulic cylinder and controlling the pressure on the tank side of the hydraulic machine if the detected direction corresponds to the hydraulic cylinder being driven by the load.

56. The method as claimed in claim 47, wherein the hydraulic cylinder is arranged to move an implement on a work machine.

* * * * *